J. ANDERSON.
CREAM SEPARATOR STRAINER.
APPLICATION FILED OCT. 9, 1917.
1,293,297. Patented Feb. 4, 1919.
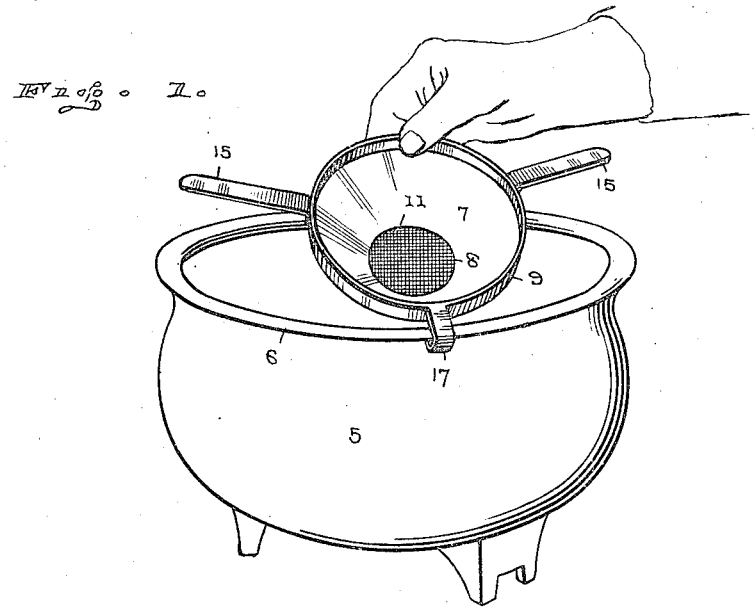
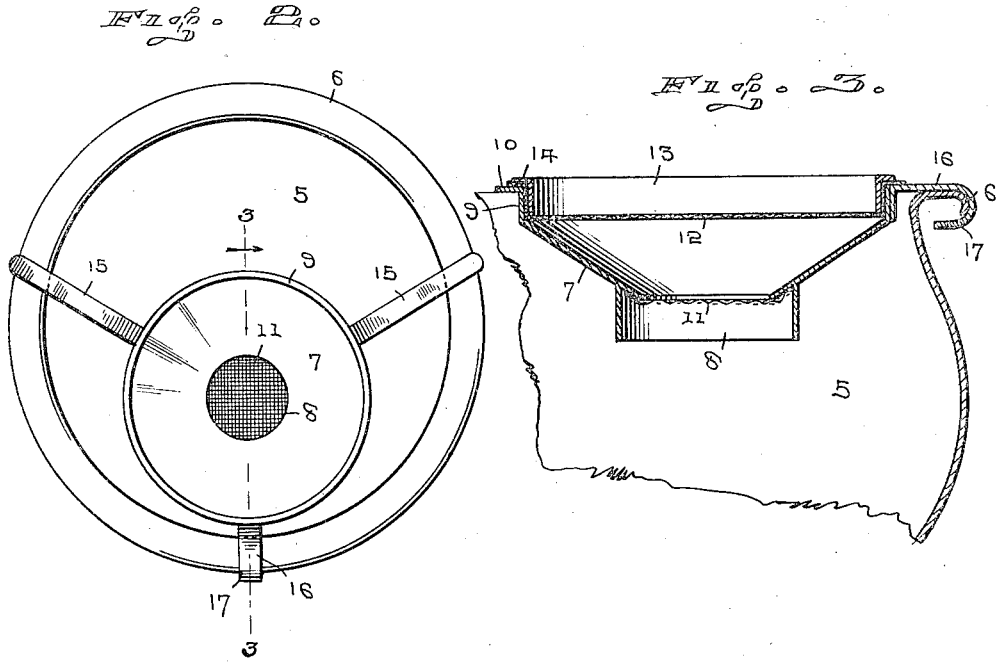
Inventor
Joseph Anderson
By Fitz Gerald & Co.
Attorneys

UNITED STATES PATENT OFFICE.

JOSEPH ANDERSON, OF HARRISVILLE, MICHIGAN.

CREAM-SEPARATOR STRAINER.

1,293,297.  Specification of Letters Patent.  Patented Feb. 4, 1919.

Application filed October 9, 1917. Serial No. 195,581.

*To all whom it may concern:*

Be it known that I, JOSEPH ANDERSON, a citizen of the United States, residing at Harrisville, in the county of Alcona and State of Michigan, have invented certain new and useful Improvements in Cream-Separator Strainers; and I do hereby declare the following to be a full, clear, and exact description of the invention, such as will enable others skilled in the art to which it appertains to make and use the same.

My invention is in the nature of a cream separator strainer and has for its objects to provide a device of the character specified which will possess many improvements over other strainers now known and which, by reason of its peculiar construction, will be adapted to general uses as well as to cream separators.

Specific objects of the invention are to provide a strainer of such construction that it will set inside of the supply can, thereby obviating the necessity of lifting the pail so high when pouring the milk into the strainer; to provide a strainer with improved supports whereby it will be safely held in position while pouring milk into it; to provide means whereby a larger cloth may be used at the top of the strainer; and to simplify, cheapen and improve the construction of strainers whereby their usefulness is greatly increased.

With these objects in view, my invention consists in the improved construction, arrangement, and combination of parts hereinafter fully described, and afterward specifically claimed.

In order that the construction and operation thereof may be readily comprehended, I have illustrated an approved embodiment of my invention in the accompanying drawings, and will now proceed to fully describe the same, having reference to said drawings, in which, Figure 1 illustrates in perspective a separator pan with my improved strainer being placed in position therein for use, Fig. 2, a top plan view of my strainer in position in a separator pan, and Fig. 3, a sectional view taken on the vertical plane indicated by the dotted line 3—3 of Fig. 2, looking in the direction of the arrow.

Like reference characters mark the same parts in all of the figures of the drawing.

Referring particularly to the drawing, 5 indicates the ordinary pan of a cream separator having the usual, turned over top edge 6.

My strainer, indicated at 7, has a body of frusto-conical form with a cylindrical ring 8, at the bottom and a similar ring 9 at the top edge, and a horizontal flange 10 may be projected outwardly from the top ring.

The ordinary strainer 11 is provided at the bottom of the body and a cloth strainer 12 may be provided at the top of the body, which will be held in place by a ring 13 which enters the ring 9 of the strainer and is provided with a horizontal flange 14 to rest upon the flange 10 to hold the outer edge of the cloth.

Secured to the upper ring 9 of the strainer are three supports, indicated at 15, 15 and 16, projecting radially therefrom at preferably equi-distant positions, the two former, 15, 15, being simple straight bars and the latter, 16, being turned downward, and under, at 17, in hook form, to rest upon and hook under the edge 6 of the pan, while the supports 15, 15, rest upon said edge, being sufficiently long to support a strainer upon the top of pans of different sizes.

In using the strainer, the hook end 17 of the support 16 is engaged under the turned down edge of rim 6 of the pan and the straight supports 15, laid upon said rim, when, by pouring the milk at the side where the hooked support 16 is located, the hooked end 17 is pressed into and held in engagement with the pan rim and the strainer securely locked in position, and the necessity of lifting the milk pail high above the strainer while pouring, is obviated.

The holding means for the cloth strainer is larger than usual thereby allowing of an easier passage of the milk therethrough without clogging.

The strainer is simpler and of a less number of parts thus rendering it more sanitary, easier cleanable, and more economical in construction.

By reason of the strainer being held close to one side of the pan, it is not necessary that it be of the full size of the pan whereby one strainer may be used with almost any size of pan.

Other advantages will appear in the use of my strainer and, obviously, slight changes and variations may be made, within the scope of the claim, without departing from the spirit of the invention.

Having thus fully described my invention, what I claim as new and desire to secure by Letters Patent of the United States, is:—

A strainer having a frusto-conical body, a cylindrical ring depending from the lower end of the body at a point removed from but adjacent to the opening in the bottom of the body, a strainer supported by the lower end of the body within said ring, a cylindrical ring integral with the top of the body having a horizontal flange, three supports projecting radially from said last named cylindrical ring, two of said supports being comparatively long while the other is comparatively short and formed with a down turned hook, and a cloth support adapted to fit in the upper ring and provided with a horizontal flange to rest on the flange of the upper ring of the body to support a cloth above said body.

In testimony whereof I have signed my name to this specification in the presence of two subscribing witnesses.

JOSEPH ANDERSON.

Witnesses:
L. R. Ross,
John Macgregor.